United States Patent
Hong et al.

(10) Patent No.: US 9,412,988 B2
(45) Date of Patent: Aug. 9, 2016

(54) SEPARATOR INCLUDING COATING LAYER OF INORGANIC AND ORGANIC MIXTURE, AND BATTERY INCLUDING THE SAME

(71) Applicants: Ki Chul Hong, Uiwang-si (KR); Myung Kook Park, Uiwang-si (KR); Jae Goo Doh, Uiwang-si (KR); Jun Ho Chung, Uiwang-si (KR)

(72) Inventors: Ki Chul Hong, Uiwang-si (KR); Myung Kook Park, Uiwang-si (KR); Jae Goo Doh, Uiwang-si (KR); Jun Ho Chung, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 268 days.

(21) Appl. No.: 13/778,438

(22) Filed: Feb. 27, 2013

(65) Prior Publication Data
US 2013/0224556 A1 Aug. 29, 2013

(30) Foreign Application Priority Data
Feb. 29, 2012 (KR) .................. 10-2012-0021139

(51) Int. Cl.
*H01M 2/14* (2006.01)
*H01M 2/16* (2006.01)
*H01M 10/052* (2010.01)

(52) U.S. Cl.
CPC ............ *H01M 2/1686* (2013.01); *H01M 2/166* (2013.01); *H01M 2/1653* (2013.01); *H01M 10/052* (2013.01); *Y02T 10/7011* (2013.01)

(58) Field of Classification Search
CPC .......................... H01M 2/1646; H01M 2/1686
USPC .......................................................... 429/144
See application file for complete search history.

(56) References Cited

U.S. PATENT DOCUMENTS

| 2002/0192561 | A1 | 12/2002 | Noh | |
|---|---|---|---|---|
| 2004/0053122 | A1* | 3/2004 | Sugiyama | H01M 2/1653 429/144 |
| 2006/0105244 | A1* | 5/2006 | Kejha | H01G 9/02 429/242 |
| 2007/0082261 | A1* | 4/2007 | Lee | H01M 2/145 429/144 |
| 2009/0291360 | A1* | 11/2009 | Kim | H01M 2/1653 429/145 |

(Continued)

FOREIGN PATENT DOCUMENTS

| EP | 1-011-157 A2 | 6/2000 |
|---|---|---|
| EP | 2-378-595 A2 | 10/2011 |

(Continued)

OTHER PUBLICATIONS

Search Report mailed Jun. 3, 2013 in corresponding European Patent Application No. 13156816.4.

(Continued)

*Primary Examiner* — Patrick Ryan
*Assistant Examiner* — Kiran Quraishi
(74) *Attorney, Agent, or Firm* — Lee & Morse, P.C.

(57) ABSTRACT

A porous separator including a porous base film; and a coating layer, the coating layer being on a surface of the porous base film and including a polyvinylidene fluoride homopolymer, a polyvinylidene fluoride-hexafluoropropylene copolymer, and inorganic particles, wherein the separator exhibits a thermal shrinkage of about 30% or less in a machine direction (MD) or in a transverse direction (TD), as measured after leaving the separator at 150° C. for 1 hour, a peel strength of about 50 gf/cm² or more between the coating layer and the base film, and an adhesive strength of about 20 gf/cm² or more between the coating layer and electrodes of a battery.

16 Claims, 2 Drawing Sheets

(56) References Cited

U.S. PATENT DOCUMENTS

| | | | |
|---|---|---|---|
| 2011/0045338 A1* | 2/2011 | Bae | H01M 2/1646 429/144 |
| 2011/0293976 A1* | 12/2011 | Chiba | H01M 2/166 429/94 |
| 2013/0017429 A1* | 1/2013 | Ha | H01M 2/1653 429/144 |
| 2013/0115519 A1* | 5/2013 | Lee | C08G 73/1042 429/252 |

FOREIGN PATENT DOCUMENTS

| | | | | |
|---|---|---|---|---|
| JP | 2006-120462 A | 5/2006 | | |
| KR | 100727248 B1 | 6/2007 | | |
| KR | 10-0877161 B1 | 12/2008 | | |
| WO | WO2011115376 | * | 9/2011 | H01M 2/14 |
| WO | WO2011159087 | * | 12/2011 | H01M 10/0525 |

OTHER PUBLICATIONS

Office Action issued Jun. 20, 2014 in corresponding Korean Patent Application No. 10-2012-0021140.

USPTO Action mailed Mar. 18, 2016, in U.S. Appl. No. 13/778,259, wherein claims were provisionally rejected on the ground of nonstatutory double patenting over claims of the captioned application.

Provisional double patenting rejection of claims; USPTO Office action mailed Mar. 4, 2016, in U.S. Appl. No. 13/778,332.

* cited by examiner

SEPARATOR INCLUDING COATING LAYER OF INORGANIC AND ORGANIC MIXTURE, AND BATTERY INCLUDING THE SAME

CROSS-REFERENCE TO RELATED APPLICATION

Korean Patent Application No. 10-2012-0021139 filed on Feb. 29, 2012, in the Korean Intellectual Property Office, and entitled: "SEPARATOR INCLUDING COATING LAYER OF INORGANIC AND ORGANIC MIXTURE, AND BATTERY INCLUDING THE SAME," is incorporated by reference herein in its entirety.

BACKGROUND

1. Field

Embodiments relate to a separator including a coating layer of an organic and inorganic mixture, and a battery including the same.

2. Description of the Related Art

A separator for an electrochemical battery refers to a middle layer disposed inside a battery to isolate a positive electrode and a negative electrode from each other while maintaining ionic conductivity to permit charge and discharge of the battery.

Recently, electrochemical batteries have been developed to have a lighter and thinner structure to improve portability of electronic devices, e.g., mobile devices and notebook computers, while ensuring high output and high capacity for use in electric cars and the like. Consequently, a separator for batteries should have a slim thickness and a light weight while ensuring high adhesion and shape stability based on high heat resistance in order to produce high capacity batteries.

SUMMARY

Embodiments are directed to a separator including a coating layer of an organic and inorganic mixture, and a battery including the same.

The embodiments may be realized by providing a porous separator including a porous base film; and a coating layer, the coating layer being on a surface of the porous base film and including a polyvinylidene fluoride homopolymer, a polyvinylidene fluoride-hexafluoropropylene copolymer, and inorganic particles, wherein the separator exhibits a thermal shrinkage of about 30% or less in a machine direction (MD) or in a transverse direction (TD), as measured after leaving the separator at 150° C. for 1 hour, a peel strength of about 50 gf/cm$^2$ or more between the coating layer and the base film, and an adhesive strength of about 20 gf/cm$^2$ or more between the coating layer and electrodes of a battery.

The porous base film may be a polyolefin film.

The polyolefin film may be one selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

The battery may be a lithium ion rechargeable battery.

The electrodes of the battery may include a positive electrode, the positive electrode being selected from the group of a lithium cobalt oxide electrode, a lithium nickel cobalt manganese oxide electrode, a lithium manganese oxide electrode, a lithium iron phosphate electrode, and a lithium nickel oxide electrode, and a negative electrode, the negative electrode being a crystalline carbon electrode or an amorphous carbon electrode.

The polyvinylidene fluoride homopolymer may have a weight average molecular weight of about 1,000,000 g/mol or more.

The polyvinylidene fluoride homopolymer may have a weight average molecular weight of about 1,000,000 g/mol to about 1,200,000 g/mol.

The polyvinylidene fluoride-hexafluoropropylene copolymer may have a weight average molecular weight of about 800,000 g/mol or less.

The polyvinylidene fluoride-hexafluoropropylene copolymer may have a weight average molecular weight of about 600,000 g/mol to about 800,000 g/mol The coating layer may include about 5 to about 10 parts by weight of the polyvinylidene fluoride homopolymer, about 5 to about 20 parts by weight of the polyvinylidene fluoride-hexafluoropropylene copolymer, and about 70 to about 90 parts by weight of the inorganic particles, all based on 100 parts by weight of the coating layer in terms of solid content.

The inorganic particles may include particles selected from the group of $Al_2O_3$, $SiO_2$, $B_2O_3$, $Ga_2O_3$, $TiO_2$, and $SnO_2$.

The inorganic particles may include $Al_2O_3$ particles.

The coating layer may have a thickness of about 0.01 μm to about 20 μm.

Hexafluoropropylene may be present in the polyvinylidene fluoride-hexafluoropropylene copolymer in an amount of about 0.1% by weight to about 40% by weight, based on a total weight of the polyvinylidene fluoride-hexafluoropropylene copolymer.

The embodiments may also be realized by providing an electrochemical battery including a positive electrode; a negative electrode; an electrolyte; and the separator according to an embodiment.

The electrochemical battery may be a lithium rechargeable battery.

The embodiments may also be realized by providing an electrochemical battery including a positive electrode; a negative electrode; an electrolyte; and a separator interposed between the positive electrode and the negative electrode, the separator including a base film having a coating layer thereon, the coating layer being formed by dissolving a polyvinylidene fluoride-hexafluoropropylene copolymer having a weight average molecular weight of about 800,000 g/mol or less in one solvent to provide a first mixture, dissolving a polyvinylidene fluoride homopolymer having a weight average molecular weight of about 1,000,000 g/mol or more in another solvent to provide a second mixture, combining the first mixture and the second mixture with inorganic particles to form a coating composition, applying the coating composition to the base film, and removing the solvent from the applied coating composition so as to provide the coating layer on the base film.

The embodiments may also be realized by providing a porous separator including a porous base film; and a coating layer, the coating layer being on at least one surface of the porous base film and including about 5 to about 10 parts by weight of a polyvinylidene fluoride homopolymer, about 5 to about 20 parts by weight of a polyvinylidene fluoride-hexafluoropropylene copolymer, and about 70 to about 90 parts by weight of inorganic particles, all based on 100 parts by weight of the coating layer in terms of solid content.

The polyvinylidene fluoride homopolymer may have a weight average molecular weight of about 1,000,000 g/mol or more.

The polyvinylidene fluoride-hexafluoropropylene copolymer may have a weight average molecular weight of about 800,000 g/mol or less.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
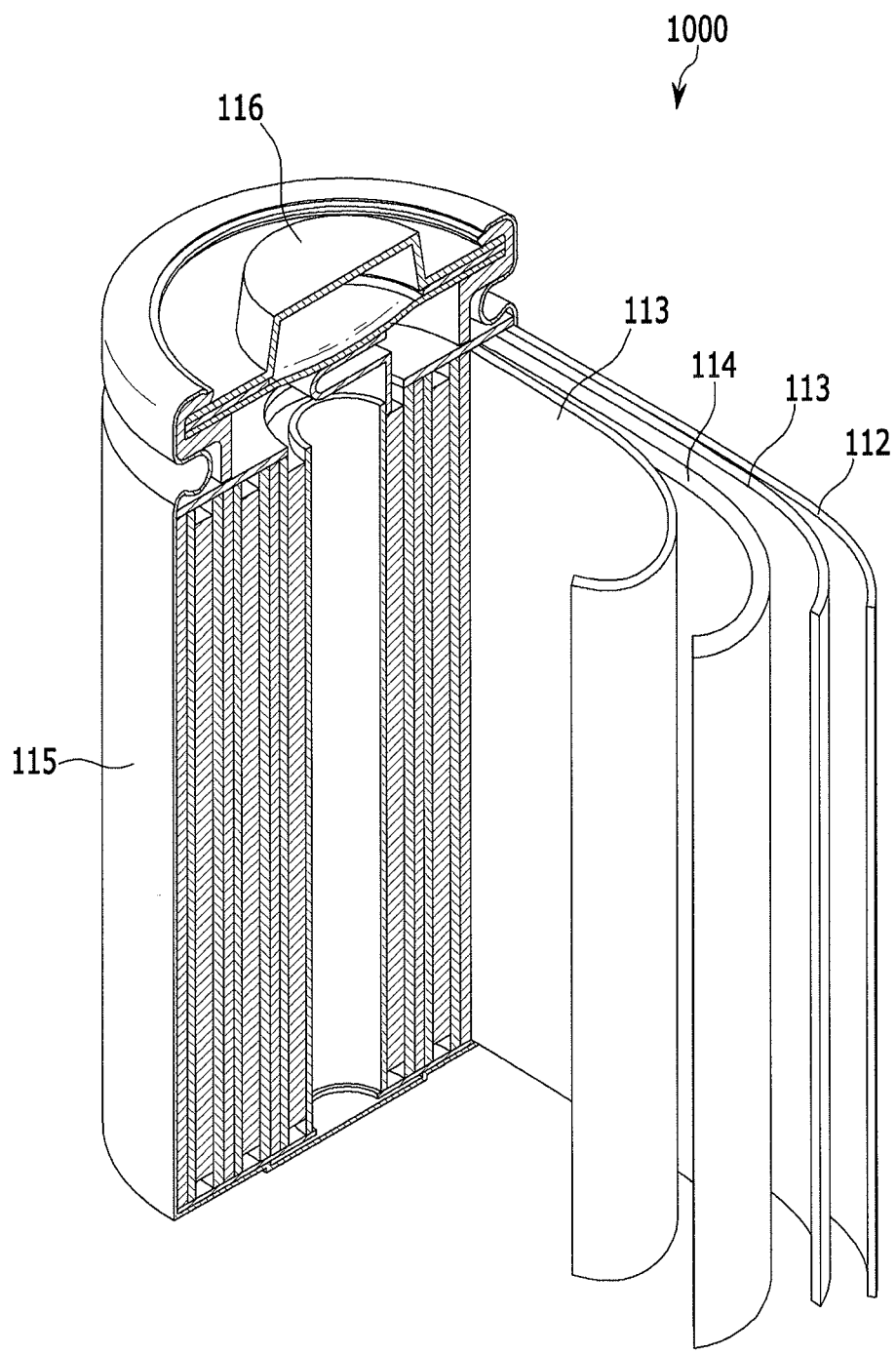
FIG. 1 illustrates a schematic view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

FIG. 1 illustrates a schematic view of a rechargeable battery according to an embodiment.

Referring to FIG. 1, a rechargeable battery 1000 according to an embodiment may include an electrode assembly including a positive electrode 114, a negative electrode 112 (facing the positive electrode 114), a separator 113 (interposed between the positive electrode 114 and negative electrode 112), an electrolyte solution (not shown), a battery case 115 (accommodating the electrode assembly), and a sealing member 116 (sealing the battery case 115). FIG. 1 shows a cylindrical rechargeable battery as an example; embodiments may be applied to other types of batteries, e.g., prismatic, etc.

Figure 2:
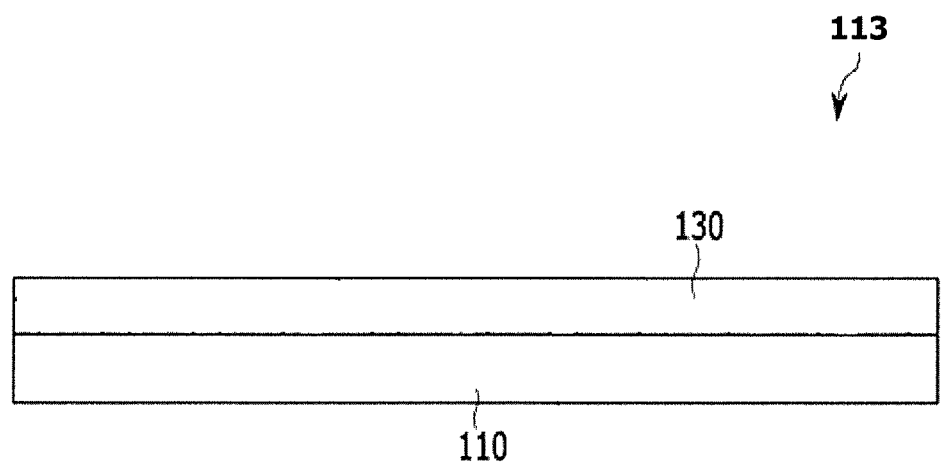
FIG. 2 illustrates a cross-sectional view of a separator for a rechargeable battery according to an embodiment.

FIG. 2 illustrates a cross-sectional view of a separator for a rechargeable battery according to an embodiment.

In the example embodiment shown in FIG. 2, the separator 113 for the rechargeable battery 1000 according to an embodiment may include a porous base film 110 and a coating layer 130 on a surface (or both surfaces) of the porous base film 110. The coating layer 130 may include an organic and inorganic mixture formed on one or both surfaces of the porous base film 110.

The embodiments provide a porous separator. The porous separator may include the porous base film and the coating layer of an organic and inorganic mixture on one or both surfaces of the porous base film. The coating layer may include a polyvinylidene fluoride homopolymer, a polyvinylidene fluoride-hexafluoropropylene copolymer, and inorganic particles.

The separator may exhibit: a) a thermal shrinkage of about 30% or less in a machine direction (MD) or in a transverse direction (TD) as measured after leaving the separator at 150° C. for 1 hour, b) a peel strength of about 50 $gf/cm^2$ or more between the coating layer and the base film, and c) an adhesive strength of about 20 $gf/cm^2$ or more between the coating layer and electrodes of a battery.

In an implementation, the polyvinylidene fluoride (PVdF) homopolymer may have a weight average molecular weight of about 1,000,000 g/mol or more, e.g., about 1,000,000 g/mol to about 1,200,000 g/mol.

Maintaining the weight average molecular weight within this range may help ensure that the polyvinylidene fluoride (PVdF) homopolymer helps improve adhesive strength between the coating layer and the base film to thereby reduce thermal shrinkage and provide good adhesive strength between the coating layer and electrodes to achieve efficient suppression of short circuit between electrodes.

In addition, maintaining the weight average molecular weight within this range may help ensure that the polyvinylidene fluoride homopolymer can be easily dissolved in DMF, and thus may help prevent an excess use of DMF and possible defects during a dry process.

In an implementation, the polyvinylidene fluoride-hexafluoropropylene (PVdF-HFP) copolymer may have a weight average molecular weight of about 800,000 g/mol or less, e.g., about 600,000 g/mol to about 800,000 g/mol.

Maintaining the weight average molecular weight within this range may help ensure that the polyvinylidene fluoride-hexafluoropropylene copolymer can provide sufficiently strong adhesion between the coating layer and the base film while securing excellent electrolyte impregnation.

In the polyvinylidene fluoride-hexafluoropropylene copolymer used in the present embodiment, although the content of each of polyvinylidene fluoride and hexafluoropropylene is not particularly limited, hexafluoropropylene may be present in an amount of about 0.1 to about 40% by weight, based on the total weight of the copolymer.

In an implementation, the inorganic particles may be selected from the group of $Al_2O_3$ (alumina), $SiO_2$ (silica), $B_2O_3$, $Ga_2O_3$, $TiO_2$, and $SnO_2$, without being limited thereto. These may be used alone or in combination of two or more thereof.

In an implementation, the inorganic particles may be $Al_2O_3$ particles.

In an implementation, the inorganic particles may have an average particle size or diameter of about 1 nm to about 2,000 nm, e.g., about 100 nm to about 1,000 nm. Within this size range, the inorganic particles may help prevent a deterioration in coating processibility and dispersion within a coating composition, a deterioration in mechanical properties, and an increase in electric resistance by allowing suitable adjustment of the coating layer. Further, pores of a suitable size may be created in the coating layer, thereby lowering the likelihood of internal short circuit upon charge and discharge of the battery.

In an implementation, a coating composition of the organic and inorganic mixture may include, e.g., about 5 to about 10 parts by weight of the polyvinylidene fluoride homopolymer; about 5 to about 20 parts by weight of the polyvinylidene fluoride-hexafluoropropylene copolymer; and about 70 to about 90 parts by weight of the inorganic particles, based on 100 parts by weight of the coating layer in terms of solid content.

Within this range, the inorganic particles may help provide thermal stability, e.g., heat resistance and heat dissipation, and the coating layer may be formed in a relatively flat shape by helping to prevent deterioration in coating processibility and dispersion of the coating composition.

According to an embodiment, the coating composition of the organic and inorganic mixture may include the polyvinylidene fluoride homopolymer and the polyvinylidene fluoride-hexafluoropropylene copolymer as organic binder polymer resins, and the inorganic particles. The coating composition may further contain suitable solvents and/or other additives.

In preparing the coating composition, the polyvinylidene fluoride homopolymer, the polyvinylidene fluoride-hexafluoropropylene copolymer, and the inorganic particles may be dissolved or dispersed in suitable solvents, respectively, and mixed with each other.

For example, the polyvinylidene fluoride homopolymer may be prepared as a polymer solution, which may be obtained by dissolving the polyvinylidene fluoride homopolymer in dimethylformamide (DMF). The polyvinylidene fluoride-hexafluoropropylene copolymer may be prepared as a polymer solution, which may be obtained by dissolving the polyvinylidene fluoride-hexafluoropropylene copolymer in acetone. The inorganic particles may be prepared as an inorganic dispersion, which may be obtained by dissolving or dispersing the inorganic particles in acetone.

According to an embodiment, the polyvinylidene fluoride homopolymer may have a weight average molecular weight of about 1,000,000 g/mol or more. Accordingly, the polyvinylidene fluoride homopolymer may not be dissolved in a low boiling point solvent, e.g., acetone. Thus, it may be desirable that the polyvinylidene fluoride homopolymer be dissolved in a solvent such as DMF in practical use.

Although a solvent, e.g., DMF or the like, which has a relatively high boiling point, may be insufficiently dried upon drying after coating, it is possible to prevent an excess of the solvent from remaining on the surface of the separator through suitable adjustment of drying conditions.

The polymer solutions and the inorganic dispersion may be mixed in a suitable solvent to prepare a coating composition.

Examples of suitable solvents may include ketones such as acetone, or alcohols such as methanol, ethanol, isopropyl alcohol, and the like. These solvents provide an advantage of allowing easy removal upon drying after coating.

According to an embodiment, the coating composition may be prepared in the form of a mixture obtained by sufficiently stirring the polymer solutions, the inorganic dispersion, and the solvent using a ball mill, a bead mill, or a screw mixer.

The porous separator according to an embodiment may be prepared by coating the coating composition on one or both sides of the base film, followed by drying the coating composition.

Suitable coating methods may be used to coat the base film with the coating composition. For example, dip coating, die coating, roll coating, or comma coating may be used. These coating processes may be used alone or in combination thereof.

After coating the coating composition on the base film, drying may be performed. Here, a suitable drying process may be used. For example, drying may be carried out by hot-air blowing.

Drying of the coating layer may be performed at a temperature of about 70° C. to about 120° C. Within this temperature range, drying of the coating layer may be completed within a suitable time. For example, this temperature range may provide an advantage of forming a relatively smooth coating layer by helping to prevent surface irregularity resulting from rapid drying without requiring a long drying time.

In an implementation, the coating layer of the organic and inorganic mixture may have a thickness of about 0.01 μm to about 20 μm, e.g., about 1 μm to about 15 μm. Within this thickness range, the coating layer may help provide excellent thermal stability and adhesive strength, and may help suppress an increase in internal resistance of the battery by preventing excessive increase in thickness of the separator.

According to an embodiment, the porous base film may be a polyolefin base film. The polyolefin base film may be selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

In an implementation, the base film may have a thickness of about 1 μm to about 40 μm, e.g., about 1 μm to about 25 μm. Within this thickness range of the base film, the separator may be formed to a suitable thickness, thereby preventing short circuit of the positive electrode and the negative electrode while improving stability of the battery. Maintaining the thickness of the separator within this range may help prevent an increase in internal resistance of the battery.

The porous separator including the coating layer of the organic and inorganic mixture may exhibit a thermal shrinkage of about 30% or less in a machine direction (MD) or in a transverse direction (TD), as measured after leaving the separator at 150° C. for 1 hour. Within this range, the coating layer of the separator may have good peeling resistance, and a battery including the separator may have improved stability.

Here, a suitable method may be used to measure the thermal shrinkage of the separator. For example, the thermal shrinkage of the separator may be measured as follows: a prepared separator may be cut into a size of about 5 cm×about 5 cm and left in a chamber at 150° C. for 1 hour, followed by measuring degrees of shrinkage in MD and TD directions to calculate thermal shrinkage.

In the porous separator including the coating layer of the organic and inorganic mixture, peel strength between the coating layer and the base film may be about 50 gf/cm$^2$ or more. Within this range, the coating layer may have good peeling resistance, and it is possible to prevent separation of the inorganic particles from the coating layer in a process of assembling the battery using the separator. Further, within this range, the separator may exhibit sufficiently strong adhesion between the coating layer and the base film to help prevent shrinkage the base film due to heat and separation between the coating layer and the base film due to overheating of the battery, thereby preventing short circuit of the electrodes while improving thermal stability.

Here, a suitable method may be used to measure the peel strength of the coating layer. For example, the peel strength of the coating layer may be measured as follows: a prepared coating layer may be cut into a 1.5 cm×7 cm specimen, which in turn may be strongly attached to a glass plate using a transparent double-sided tape (3M), followed by measuring force required to separate the coating layer using a tensile strength tester (UTM; Universal Test Machine).

When the porous separator including the coating layer of the organic and inorganic mixture according to an embodiment is applied to an electrochemical battery, the coating layer may exhibit an adhesive strength of about 20 gf/cm$^2$ or more to electrodes of the battery. Within this range, the coating layer and the electrodes may be sufficiently strongly attached together to suppress thermal shrinkage of the separator, thereby helping to prevent a short circuit in the positive and negative electrodes. In addition, in production of high output large capacity batteries, the separator may help improve stability and lifespan of the batteries.

Here, a suitable method may be used to measure adhesive strength between the coating layer and the electrodes. For example, the adhesive strength between the coating layer and the electrodes may be measured as follows: a prepared separator may be placed between both electrodes to prepare a battery stack of positive electrode/separator/negative electrode, which in turn may be inserted into an aluminum pouch. Then, with an electrolyte injected into the aluminum pouch, the aluminum pouch may be sealed and formed into a single-plate cell, which in turn may be subjected to a force of 100 kgf/cm² for 20 seconds at 50° C. and left for 12 hours. Next, after disassembling each of the single-plate cells, the battery stack of the positive electrode, the separator and the negative electrode bonded to each other may be cut into a size of 1.5 cm (MD)×7 cm (TD) and attached to a glass plate using a transparent double-sided tape (3M), followed by measuring adhesive strength between the electrodes and the separator using a tensile strength tester (UTM; Universal Test Machine).

An embodiment provides an electrochemical battery, which includes the porous separator including the coating layer of the organic and inorganic mixture, a positive electrode, and a negative electrode, and which is filled or impregnated with an electrolyte.

Examples of the electrochemical battery according to an embodiment may include lithium rechargeable batteries, such as lithium metal rechargeable batteries, lithium ion rechargeable batteries, lithium polymer rechargeable batteries, lithium ion polymer rechargeable batteries, or the like.

A suitable method may be used in manufacture of the electrochemical battery according to an embodiment.

For example, the electrochemical battery according to an embodiment may be manufactured by placing the porous (e.g., polyolefin) separator including the coating layer of the organic and inorganic mixture between a positive electrode and a negative electrode, and filling a space therebetween or impregnating with an electrolyte.

The electrodes of the electrochemical battery may be prepared in the form of assemblies of electrode active materials and current collectors, which are combined by a suitable method.

As the positive active material of the battery, a suitable positive electrode active material may be used. For example, the positive electrode may include a positive electrode active material, which allows reversible intercalation and deintercalation of lithium ions. Examples of such positive electrode active materials may include composite metal oxides of lithium and at least one metal selected from cobalt, manganese, and nickel. The amount of lithium dissolved between metal elements may be determined in various ways. In addition to these metals, the positive electrode active material may further include an element selected from the group of Mg, Al, Co, Ni, K, Na, Ca, Si, Ti, Sn, V, Ge, Ga, B, As, Zr, Mn, Cr, Fe, Sr, V, and rare earth metal elements. In an implementation, the positive electrode may be a composite metal oxide of lithium and a metal selected from the group of Co, Ni, Mn, Al, Si, Ti and Fe, or lithium cobalt oxide (LCO, for example, $LiCoO_2$), lithium nickel cobalt manganese oxide (NCM, for example, $Li[Ni(x)Co(y)Mn(z)]O_2$), lithium manganese oxide (LMO, for example, $LiMn_2O_4$, $LiMnO_2$), lithium iron phosphate (LFP, for example, $LiFePO_4$), lithium nickel oxide (LNO, for example, $LiNiO_2$), and the like.

The negative electrode may include a negative electrode active material, which allows reversible intercalation and deintercalation of lithium ions. Examples of such negative electrode active materials may include crystalline or amorphous carbon, or carbonous negative electrode active materials of carbon composites (thermally decomposed carbon, coke, graphite), combusted organic polymer compounds, carbon fibers, tin oxide compounds, lithium metals, or alloys of lithium and other elements. Examples of amorphous carbon may include hard carbon, coke, mesocarbon microbead (MCMB) baked at 1,500° C., mesophase pitch-based carbon fiber (MPCF) baked at 1,500° C., and the like. Examples of crystalline carbon may include graphite materials, such as natural graphite, graphitized coke, graphitized MCMB, graphitized MPCF, and the like. In an implementation, the negative electrode may be a crystalline or amorphous carbon electrode.

The positive electrode or negative electrode may be produced by dispersing an electrode active material, a binder, a conductive material, and, if desired, a thickener, in a solvent to produce an electrode slurry composition, followed by depositing the slurry composition on an electrode current collector. The positive electrode current collector may be made of aluminum, aluminum alloys, or the like. The negative electrode current collector may be made of copper, copper alloys, or the like. The positive electrode current collector and negative electrode current collector may be prepared in the form of a foil or mesh.

As the current collector of the battery according to an embodiment, a suitable current collector may be used. Examples of the positive electrode current collector may include aluminum foils, nickel foils, and combinations thereof. Examples of the negative electrode current collector may include copper foils, gold foils, nickel foils, copper alloy foils, and combinations thereof. As the electrolyte of the battery according to an embodiment, a suitable electrolyte for electrochemical batteries may be used. The electrolyte may be obtained through dissolution or dissociation of a salt having, e.g., a structure of $A^+ B^-$ in an organic solvent. Examples of the $A^+$ component, e.g., a cation, may include alkali metal cations such as $Li^+$, $Na^+$ or $K^+$, and combinations thereof. Examples of the B-component, e.g., an anion, may include $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$, and combinations thereof.

Examples of the organic solvent may include propylene carbonate (PC), ethylene carbonate (EC), diethylcarbonate (DEC), dimethylcarbonate (DMC), dipropylcarbonate (DPC), dimethylsulfoxide, acetonitrile, dimethoxyethane, diethoxyethane, tetrahydrofuran, N-methyl-2-pyrrolidone (NMP), ethylmethylcarbonate (EMC), and γ-butyrolactone, and the like. These may be used alone or in combination thereof.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

EXAMPLES 1 TO 5 AND COMPARATIVE
EXAMPLES 1 TO 4

Preparation of Polyolefin Porous Separator Including
Coating Layer of Organic and Inorganic Mixture Example 1

(1) Preparation of Coating Composition

1) A polyvinylidene fluoride-hexafluoropropylene ('PVdF-HFP') copolymer (Solvay) having a weight average molecular weight of 700,000 g/mol was added in an amount of 10 wt % to acetone (Daejung Chemicals & Metals), followed by stirring at 25° C. for 4 hours using a stirrer to prepare a first polymer solution.

2) A polyvinylidene fluoride ('PVdF') homopolymer (Sovay) having a weight average molecular weight of 1,100,000 g/mol was added in an amount of 10 wt % to DMF (Daejung Chemicals & Metals), followed by stirring at 25° C. for 4 hours using a stirrer to prepare a second polymer solution.

3) Alumina particles (Nippon Light Metal Company, Ltd.) were added in an amount of 25 wt % to acetone (Daejung Chemicals & Metals), followed by milling for dispersion at 25° C. for 3 hours using a ball mill to prepare an inorganic dispersion.

The prepared first polymer solution, second polymer solution, and inorganic dispersant were mixed in a ratio of first polymer solution:second polymer solution:inorganic dispersion:solvent (acetone) of 1:1:3:6, and stirred at 25° C. for 2 hours using a power mixer to prepare a coating composition.

(2) Preparation of Separator

The prepared coating composition was deposited on both sides of a 16 μm thick polyethylene monolayer base film by dip coating and dried to prepare a separator, which had a coating composition loading amount of 12 g/m$^2$ and a 8 μm thick coating layer. The term of "a coating composition loading amount" refers to a weight per unit area of the coating layer.

Example 2

A separator was prepared in the same manner as in Example 1, except that the coating composition was prepared by mixing the first polymer solution, the second polymer solution, the inorganic dispersion, and solvent (acetone) in a ratio of 0.7:0.3:3:6 in (1) of Example 1.

Example 3

A separator was prepared in the same manner as in Example 1, except that the coating composition was prepared by mixing the first polymer solution, the second polymer solution, the inorganic dispersion, and solvent (acetone) in a ratio of 0.9:0.1:3:6 in (1) Example 1.

Example 4

A separator was prepared in the same manner as in Example 1, except that the coating composition was prepared by mixing the first polymer solution, the second polymer solution, the inorganic dispersion, and solvent (acetone) in a ratio of 1:1:6:9 in (1) of Example 1.

Example 5

A separator was prepared in the same manner as in Example 1, except that the prepared separator had a coating composition loading amount of 7 g/m$^2$ and a 4 μm thick coating layer in (2) of Example 1.

Comparative Example 1

A separator was prepared in the same manner as in Example 1, except that the coating composition was prepared without using the second polymer solution by mixing the first polymer solution, the inorganic dispersion, and the solvent (acetone) in a ratio of 1:1.5:3 in (1) of Example 1.

Comparative Example 2

A separator was prepared in the same manner as in Example 1, except that a PVdF homopolymer having a weight average molecular weight of 500,000 g/mol was used in (1) of Example 1.

Comparative Example 3

A separator was prepared in the same manner as in Example 1, except that a PVdF homopolymer having a weight average molecular weight of 700,000 g/mol was used in (1) of Example 1.

Comparative Example 4

A separator was prepared in the same manner as in Example 1 except that a PVdF homopolymer having a weight average molecular weight of 900,000 g/mol was used in (1) of Example 1.

Experimental Example 1

Measurement of Thermal Shrinkage of Separator

Each of the separators prepared in Examples 1 to 5 and Comparative Examples 1 to 4 was cut into 5 cm width×5 cm length pieces to prepare a total of 9 specimens. Each of the specimens was left in a chamber at 150° C. for 1 hour, followed by measuring degrees of shrinkage of each specimen in MD and TD directions to calculate thermal shrinkage.

Measurement results of thermal shrinkage are shown in Table 1, below.

Experimental Example 2

Measurement of Peel Strength Between Coating Layer and Base Film

Each of the coating layers prepared in Examples 1 to 5 and Comparative Examples 1 to 4 was cut into 1.5 cm×7 cm pieces to prepare a total of 9 specimens. Each specimen was strongly attached to a glass plate using a transparent double-sided tape (3M), followed by measuring force for separating the coating layer using a tensile strength tester (UTM; Universal Test Machine).

Measurement results of peel strength are shown in Table 1.

Experimental Example 3

Measurement of Adhesive Strength Between Coating Layer and Electrode

Each of the separators prepared in Examples 1 to 5 and Comparative Examples 1 to 4 was placed and bonded between both electrodes to prepare a battery stack of positive electrode/separator/negative electrode, which in turn was inserted into an aluminum pouch. Then, with an electrolyte injected into the aluminum pouch, the aluminum pouch was sealed and formed into three single-plate cells, which in turn were subjected to a force of 100 kgf/cm$^2$ at 50° C. for 20 seconds and then left for 12 hours. Next, after disassembling each of the single-plate cells, the battery stack of the positive electrode, the separator and the negative electrode bonded to each other was cut into a size of 1.5 cm (MD)×7 cm (TD) and attached to a glass plate using a transparent double-sided tape (3M), followed by measuring adhesive strength between the coating layer and the electrodes of the separator using a tensile strength tester (UTM; Universal Test Machine). The positive electrode was a lithium cobalt oxide (LCO) electrode, and the negative electrode was a crystalline carbon electrode.

Measurement results of adhesive strength are shown in Table 1.

TABLE 1

| Samples | Thermal shrinkage of separator (%) | Peel strength between coating layer and base film (gf/cm$^2$) | Adhesive strength between coating layer and electrode (gf/cm$^2$) |
| --- | --- | --- | --- |
| Example 1 | 15 | 100 | 42 |
| Example 2 | 18 | 90 | 37 |
| Example 3 | 25 | 65 | 25 |
| Example 4 | 10 | 80 | 28 |
| Example 5 | 20 | 90 | 35 |
| Comparative Example 1 | 30 | 10 | 5 |
| Comparative Example 2 | 28 | 20 | 8 |
| Comparative Example 3 | 25 | 35 | 13 |
| Comparative Example 4 | 25 | 45 | 17 |

As shown in Table 1, it may be seen that the separators prepared in Examples 1 to 5 using the PVdF-HFP copolymer having a weight average molecular weight of 700,000 g/mol and the PVdF homopolymer having a weight average molecular weight of 1,100,000 g/mol demonstrated better results in terms of all of the test items, such as thermal shrinkage, peel strength, and adhesive strength, than the separators prepared in Comparative Examples 1 to 4 (wherein the components of the coating composition were different or the PVdF homopolymer having a molecular weight of less than 1,000,000 g/mol were used).

For example, it may be seen that the peel strength between the coating layer and the base film gradually increased with increasing weight average molecular weight of the PVdF homopolymer and abruptly increased by about 2.2 times when the PVdF homopolymers having weight average molecular weights of 900,000 g/mol and 1,100,000 g/mol were used. Thus, it was considered that the use of a PVdF homopolymer having a weight average molecular weight of 1,000,000 g/mol or more could provide sufficiently high peel strength. Further, the adhesive strength between the coating layer and electrodes also exhibited a similar tendency to the peel strength.

Meanwhile, comparing the test results of Examples 1 to 5, it may be seen that the thermal shrinkage of the separator was adjustable according to a ratio of the respective components used in preparation of the coating composition, e.g., the ratio of the PVdF-HFP copolymer, PVdF homopolymer, inorganic particles, and solvent, and that the peel strength between the coating layer and the separator and the adhesive strength between the coating layer and the electrodes were also adjustable according to the ratio of the respective components in the coating composition.

By way of summation and review, a method for producing a separator for rechargeable batteries with improved thermal stability may include coating a polyolefin film with a polyvinylidene fluoride-hexafluoropropylene copolymer as an organic polymer together with inorganic additives. Although this method may provide improved thermal stability by coating inorganic particles on a separator, the single use of the polyvinylidene fluoride-hexafluoropropylene copolymer as an organic polymer to form a coating layer may make it difficult to achieve other effects in addition to smooth coating of the inorganic additives.

For example, with increasing capacity of batteries, it may be difficult for some techniques to ensure desired adhesion between electrodes and a separator, and there may be an increasing likelihood of deteriorating adhesion to the electrodes due to inorganic particles on the surface of the separator.

Therefore, the embodiments provide a separator for batteries having high heat resistance and high shape stability while ensuring good adhesion to electrodes.

The embodiments provide a separator having improved stability by coating an organic and inorganic mixture on a porous base film.

The embodiments provide a porous separator for batteries, the porous separator including a coating layer of an organic and inorganic mixture and exhibiting high heat resistance and good adhesion to electrodes.

The embodiments provide a porous separator for batteries, the porous separator including a coating layer of an organic and inorganic mixture containing a polyvinylidene fluoride homopolymer and a polyvinylidene fluoride-hexafluoropropylene copolymer, as organic binders, and inorganic particles to exhibit good properties in terms of adhesion and thermal stability, to prevent short circuit between positive and negative electrodes, and to improve stability of an electrochemical battery including the separator.

The embodiments provide an electrochemical battery including the separator between a positive electrode and a negative electrode to provide a lighter and thinner structure while providing high capacity.

The separator according to an embodiment may include a coating layer of an organic and inorganic mixture, which contains a polyvinylidene fluoride homopolymer, a polyvinylidene fluoride-hexafluoropropylene copolymer, and inorganic particles, on a porous base film, thereby providing good adhesion and good thermal stability.

The embodiments provide a separator, which includes the coating layer of the organic and inorganic mixture and exhibits good properties in terms of thermal resistance, shape stability, and adhesion to electrodes, thereby facilitating fabrication of a thin and/or high output high capacity electrochemical battery.

The embodiments provide a battery which is manufactured using the separator and has improved stability, thereby ensuring long term use of the battery.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A porous separator, comprising:
   a porous base film; and
   a coating layer, the coating layer being on a surface of the porous base film and including:
   a polyvinylidene fluoride homopolymer, the polyvinylidene fluoride homopolymer having a weight average molecular weight of 1,000,000 g/mol or more,
   a polyvinylidene fluoride-hexafluoropropylene copolymer, the polyvinylidene fluoride-hexafluoropropylene copolymer having a weight average molecular weight of 800,000 g/mol or less, and
   inorganic particles,
   wherein the porous base film is a polyolefin film, and
   wherein the separator exhibits:

a thermal shrinkage of 30% or less in a machine direction (MD) or in a transverse direction (TD), as measured after leaving the separator at 150° C. for 1 hour, a peel strength of 50 gf/cm² or more between the coating layer and the base film, and an adhesive strength of 20 gf/cm² or more between the coating layer and electrodes of a battery.

2. The porous separator as claimed in claim 1, wherein the polyolefin film is one selected from the group of a polyethylene monolayer film, a polypropylene monolayer film, a polyethylene/polypropylene bilayer film, a polypropylene/polyethylene/polypropylene triple-layer film, and a polyethylene/polypropylene/polyethylene triple-layer film.

3. The porous separator as claimed in claim 1, wherein the battery is a lithium ion rechargeable battery.

4. The porous separator as claimed in claim 1, wherein the electrodes of the battery include:

a positive electrode, the positive electrode being selected from the group of a lithium cobalt oxide electrode, a lithium nickel cobalt manganese oxide electrode, a lithium manganese oxide electrode, a lithium iron phosphate electrode, and a lithium nickel oxide electrode, and a negative electrode, the negative electrode being a crystalline carbon electrode or an amorphous carbon electrode.

5. The porous separator as claimed in claim 1, wherein the polyvinylidene fluoride homopolymer has a weight average molecular weight of 1,000,000 g/mol to 1,200,000 g/mol.

6. The porous separator as claimed in claim 1, wherein the polyvinylidene fluoride-hexafluoropropylene copolymer has a weight average molecular weight of 600,000 g/mol to 800,000 g/mol.

7. The porous separator as claimed in claim 1, wherein the coating layer includes:

5 to 10 parts by weight of the polyvinylidene fluoride homopolymer, 5 to 20 parts by weight of the polyvinylidene fluoride-hexafluoropropylene copolymer, and 70 to 90 parts by weight of the inorganic particles, all based on 100 parts by weight of the coating layer in terms of solid content.

8. The porous separator as claimed in claim 1, wherein the inorganic particles include particles selected from the group of $Al_2O_3$, $SiO_2$, $B_2O_3$, $Ga_2O_3$, $TiO_2$, and $SnO_2$.

9. The porous separator as claimed in claim 8, wherein the inorganic particles include $Al_2O_3$ particles.

10. The porous separator as claimed in claim 1, wherein the coating layer has a thickness of 0.01 μm to 20 μm.

11. The porous separator as claimed in claim 1, wherein hexafluoropropylene is present in the polyvinylidene fluoride-hexafluoropropylene copolymer in an amount of 0.1% by weight to 40% by weight, based on a total weight of the polyvinylidene fluoride-hexafluoropropylene copolymer.

12. An electrochemical battery, comprising:
a positive electrode;
a negative electrode;
an electrolyte; and
the separator as claimed in claim 1.

13. The electrochemical battery as claimed in claim 12, wherein the electrochemical battery is a lithium rechargeable battery.

14. An electrochemical battery, comprising:
a positive electrode;
a negative electrode;
an electrolyte; and
a separator interposed between the positive electrode and the negative electrode, the separator including a base film having a coating layer thereon, the coating layer being formed by dissolving a polyvinylidene fluoride-hexafluoropropylene copolymer having a weight average molecular weight of 800,000 g/mol or less in one solvent to provide a first mixture, dissolving a polyvinylidene fluoride homopolymer having a weight average molecular weight of 1,000,000 g/mol or more in another solvent to provide a second mixture, combining the first mixture and the second mixture with inorganic particles to form a coating composition, applying the coating composition to the base film, and removing the solvent from the applied coating composition so as to provide the coating layer on the base film, wherein the base film is a polyolefin film.

15. A porous separator, comprising:
a porous base film; and
a coating layer, the coating layer being on at least one surface of the porous base film and including:
5 to 10 parts by weight of a polyvinylidene fluoride homopolymer, the polyvinylidene fluoride homopolymer having a weight average molecular weight of 1,200,000 g/mol or more,
5 to 20 parts by weight of a polyvinylidene fluoride-hexafluoropropylene copolymer, the polyvinylidene fluoride-hexafluoropropylene copolymer having a weight average molecular weight of 800,000 g/mol or less, and
70 to 90 parts by weight of inorganic particles, all based on 100 parts by weight of the coating layer in terms of solid content,
wherein the porous base film is a polyolefin film.

16. The porous separator as claimed in claim 1, wherein the base film has a thickness of 1 μm to 40 μm.

* * * * *